Figure 1:
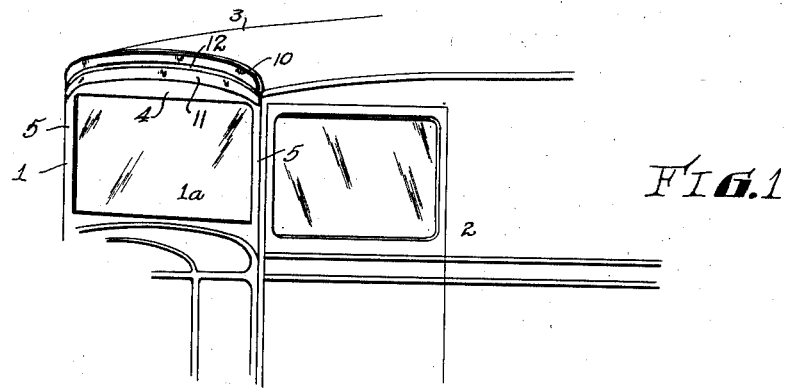

June 5, 1934.  W. LINTERN  1,961,978
VENTILATING AND/OR COOLING VEHICLE BODY

Original Filed June 30, 1931

INVENTOR
BY William Lintern
Soule & Leonard
ATTORNEYS

Patented June 5, 1934

1,961,978

UNITED STATES PATENT OFFICE 1,961,978

VENTILATING AND/OR COOLING VEHICLE BODY

William Lintern, Cleveland, Ohio

Original application June 30, 1931, Serial No. 547,938. Divided and this application January 26, 1932, Serial No. 589,019

8 Claims. (Cl. 98—2)

In United States Letters Patent No. 1,862,058, issued to me on June 7, 1932, are disclosed various forms of ventilating and/or cooling arrangements for vehicle bodies and the like and this application is a division and continuation of the application which matured into my patent.

The above patent discloses various arrangements for ventilating vehicle bodies, the essential invention being characterized by the fact that the front vehicle body wall and top vehicle body wall are relatively disposed in such manner and so configured that upon forward motion of the body, a low air pressure area is created above the outer roof level, beginning at the point at which the high air pressure air stream from the front wall joins the relatively rearwardly moving air stream above the roof and extending unbrokenly rearwardly from such point to a considerable distance back of this point, the distance depending largely upon the forward speed of the vehicle as well as the configuration of the outer body surfaces. The claims in the above patent are limited to placing the interior of the vehicle body in communication with the low pressure area lying directly above the roof surface and to constructional details of the air duct included in the means for affording such communication.

The present application claims specifically a distinctive development of the above general idea, namely an arrangement in which special deflecting means are provided on the front wall and are adapted to carry the low pressure area forwardly from the plane of the true front wall, whereby a forwardly-facing opening in either the body roof structure or the front wall structure may be used to communicate the interior of the body with the low pressure area created by the joint effect of the front wall and such special deflecting means.

This application shows also an example of the arrangement specifically claimed in my said patent. The essential characteristics of the broad invention embracing all forms disclosed both in the patent and in this application, are claimed herein only.

When a vehicle body of the closed type (that is, a body employing rigid and substantially fixed top, front, etc. wall surfaces, such, for example, as sedan and coupe bodies for pleasure cars) is moved forwardly, a high pressure air stream is created at the forward surfaces of the front wall and this high pressure air stream moves upwardly over such front wall surfaces and is deflected over the roof surface by the relatively rearwardly moving air surrounding the body. In my experiments conducted with the view to obtaining better ventilation for vehicle bodies, I discovered that without change in the extraneous surface configuration or effects of such bodies, the upwardly rising high pressure air stream creates above the extraneous upper surface of the roof, a surprisingly high degree of sub-atmospheric pressure. This area begins immediately behind the high pressure stream and extends unbrokenly for a considerable distance back from the general plane of the front wall at all driving speeds, but, as a useful force, it varies in extent longitudinally of the body in a direct proportional relationship to the forward speed of the vehicle, or more properly, with change in relative motion between the vehicle and the air through which the vehicle is passed. From a practical standpoint, this low pressure area is transversely coextensive with the entire top surfaces and continues unbrokenly rearwardly from the point of its creation to such distance that many convenient arrangements of openings and ducts in the roof or front wall structure generally may be used to obtain high ventilating efficiency by positive air withdrawal from the body. Such low pressure area continues to be effective to an appreciable degree from the time the forward motion of the vehicle starts until the vehicle is again stopped, neglecting of course the factor of winds.

So far as I know, it is entirely new with my invention to recognize and utilize the low pressure area thus naturally created as above stated, by an arrangement which is limited to communicating the interior of the body exclusively with such low pressure area.

Figure 2:
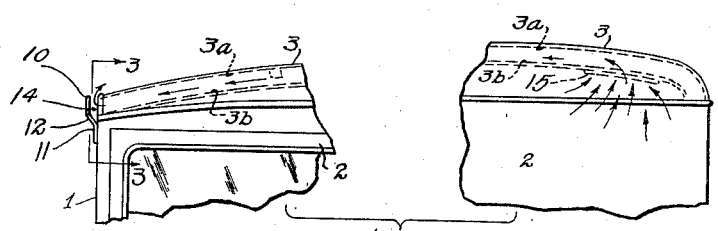
Figure 3:
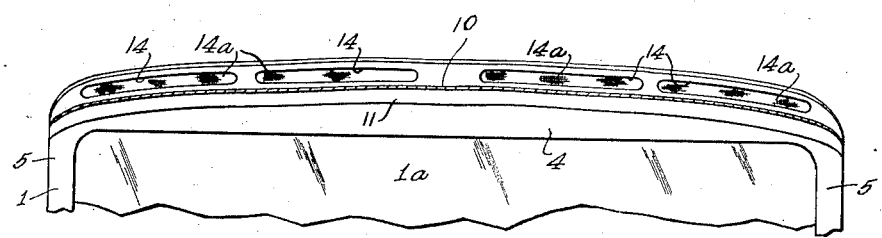
Figure 4:
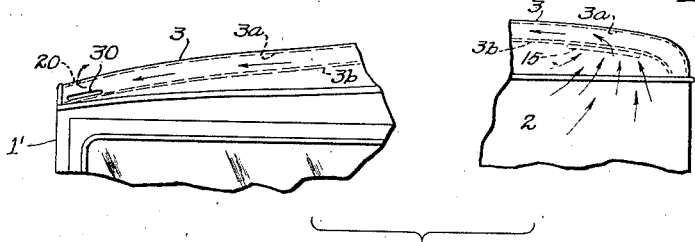
Figure 5:
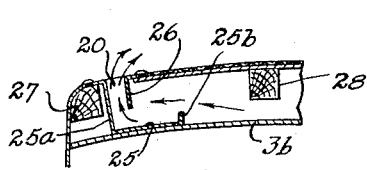

Referring to the drawing, Fig. 1 is a perspective view of the forward portion of an automobile embodying one form of the present invention; Fig. 2 is a fragmentary side elevation of the same body, portions of the body being broken away; Fig. 3 is a sectional front elevation of the embodiment shown in Fig. 2, taken substantially along the line 3—3 on Fig. 2; Fig. 4 is a view corresponding to Fig. 2, but showing a different form of the invention, and Fig. 5 shows a suitable interior construction adapted for use with an arrangement such as shown in Fig. 4.

Referring to the drawing, and first to Figs. 1 to 3, the front wall of the body is designated 1, the side walls (one being shown) 2 and the roof 3. The front wall, as shown, includes a transparent windshield or screen 1a and suitable framework therefor. The frame includes an upper cross member 4 which is joined by the roof structure 3.

As shown particularly in Fig. 2, the roof structure may be hollow to afford an air passage or duct and comprises a top wall 3a and inner wall or ceiling 3b, which may extend entirely across the body and may be joined to the sides in any suitable way. A suitable header structure (not shown) near the front edge of the roof may brace and connect the said roof walls to the body framework generally, particularly the supporting columns 5 and cross member 4 associated with the windshield, and framing the same. The above parts are simply examples of common vehicle body construction.

It will be seen that with the normal front wall, the low pressure area will be created back of the general plane of the forward surface of the front wall and above the roof, and the low pressure area may be adapted to eject air from the body as specifically claimed in my copending application. I have found that a very effective low pressure area may also be created forwardly of the plane of the front wall simply by the use of an upwardly extending flange, such as shown at 10, secured, as at 11, across the front wall (as to the member 4), the upper edge of the flange being spaced away as by a gradual bend 12 from the front surface of the front wall of the body. The flange, in effect, continues the front wall forwardly beyond the natural position thereof and for best results, the top edge of the flange 10 should be located substantially at the plane of the upper roof surface generally or thereabove, because otherwise the effective low pressure area is greatly limited.

To communicate the interior of the body with the low pressure area generated by the flange 10 and parts thereof in conjunction with the front wall of the body, I propose to employ an opening, such as at 14. Instead of a single opening, several openings may be provided (see Fig. 3) and the openings should be guarded against the entrance of insects, etc. as by suitable reticulated structures, such as wire screen 14a.

The air duct which, as shown, is afforded by the spaced roof members 3a and 3b may communicate with the body at any desired point and may be extended lengthwise of the body any desired distance. As shown, an inlet is provided to the duct at 15 by suitable means, such, for example, as the usual adjustable grill or shutter device employed for similar purposes in vehicle bodies, as is commonly known. 15 may be taken to represent diagrammatically any suitable inlet device, fixed or adjustable, as desired.

Referring now to Fig. 4, it will be seen that in this case the front wall 1' of the body is the entire agency for creating the low air pressure area and this low pressure area is communicated with the interior of the body by reason of an opening or openings at 20 directly behind the front edge of the roof, or, in other words, directly behind and closely adjacent the plane of the front surface of the body wall 1' but over the roof proper. The opening or openings 20 may extend considerably back from this front edge, but the efficiency of such greater extent of openings is not much greater than with openings of the proportions indicated in Fig. 5 at 20, which may extend substantially across the entire roof.

Suitable weather proofing is shown in Fig. 5, comprising a channel-like structure 25 within the roof structure, the forward portion of the channel (25a) joining the top wall of the roof and the rearward portion of the channel (flange 25b) being spaced from the top wall of the roof to permit air to flow to the opening 20 while precluding rearward flow of water to the roof structure. There is, in addition, a depending flange 26 also connected with the top wall of the roof and forming a part thereof if desired, but spaced along its bottom edge from the ceiling to permit air to flow under, as will be obvious.

The header construction of the body is shown as comprising a cross piece 27, and one of the top cross ribs is also shown at 28 spaced from the ceiling member 3b.

The arrangement shown in Figs. 4 and 6 may be drained by side openings 30 (see Fig. 4) through the side walls of the roof and directly aligned with the channel structure 25 to receive water therefrom, such as may, of course, enter the opening or openings 20 in wet weather. Any other suitable drainage arrangement may, of course, be provided.

Referring again to the embodiment shown in Figs. 1 to 3, it will be seen that drainage problems are greatly reduced in this arrangement for several reasons: In the first place, the forwardly facing opening or openings 14 have less tendency to collect rain than an upwardly facing opening. Further, normal rainfall readily drains out of the ends of the channel formed by the flange 10 and front wall member 4 (see Fig. 3, particularly). Moreover, the ceiling member 3b of the roof tends to shed water forwardly to discharge the same out of the openings 14, if any water should get in.

Having thus described my invention, I claim:

1. In a vehicle body, a front vehicle body wall, top and side vehicle body walls, the top vehicle body wall being in fixed relation to said front vehicle body wall, substantially joining the same, extending rearwardly therefrom and having its upper face exposed directly to the outside atmosphere and forming the topmost surface of the body, whereby upon forward movement of the body a low air pressure area is created extraneously of the body above said upper face closely adjacent and behind the effective upper limit of said front vehicle body wall by air caused to flow upwardly from said front vehicle body wall and to impinge on the relatively rearwardly moving air stream occasioned extraneously of said top wall by forward movement of the vehicle, and means so arranged that air from said stream flows directly thereover undeflected laterally, said means having an outlet disposed directly behind the point of impingement of said upwardly flowing air and the relatively rearwardly moving air stream and discharging into the low pressure area created thereby, said outlet being limited to communicate solely with the low pressure area, said means having an inlet communicating with the interior of the body.

2. Ventilating apparatus for a vehicle body, said body including a front vehicle body wall and top and side vehicle body walls extending rearwardly from the front wall, an opening in the front vehicle body wall closely adjacent the upper edge thereof, and deflecting means positioned forwardly from and in spaced relation to said opening and, in effect, continuing a portion of the front vehicle body wall upwardly beyond said opening a sufficient distance to discharge the upwardly flowing air stream from the front wall directly into the relatively rearwardly moving air stream extraneously of the body and above the level of the upper extraneous roof surface, whereby when the vehicle is in motion forwardly a low pressure area is created extraneously of the body for withdrawing air from said opening.

3. Ventilating apparatus for a vehicle body, said body including a front vehicle body wall, a roof and side vehicle body walls extending rearwardly from the front wall, an opening in the front vehicle body wall closely adjacent the upper edge thereof, and deflecting means positioned forwardly of said opening and continuously connected with the said front wall below said opening and forming, in effect, a continuation of the front wall extending upwardly beyond said opening, and substantially to the plane of the outer and upper extraneous roof surface, whereby air currents generated by forward movement of the body will flow upwardly and rearwardly above the said means unobstructedly for withdrawing air from said opening.

4. In a vehicle body having a front wall and rearwardly extending top and side walls, means for forming a low air pressure area above the roof level by deflecting air impinging on the front wall upwardly beyond the level of the upper extraneous roof surface into the relatively rearwardly moving air stream extraneously of the body resulting from forward movement of the vehicle whereby a confluent stream is formed, and means for communicating the interior of the body with the low pressure area, said last named means having an outlet disposed directly behind and substantially close to the point of confluence and directly underneath the confluent stream, said outlet being limited to communicate solely with the low pressure area, and having an inlet communicating with the interior of the body.

5. In a vehicle body having a front wall and rearwardly extending top and side walls, means for forming a low pressure area above the roof level by deflecting air impinging on the front wall upwardly directly from said wall beyond the level of the upper extraneous roof surface into a laterally undeflected relatively rearwardly moving air stream extraneously of the body resulting from forward movement of the vehicle, and means for communicating the interior of the body with the low pressure area, said last named means having a fixed outlet disposed directly behind and substantially close to the point at which the air being deflected from the front wall impinges on said relatively rearwardly moving air stream and having an inlet communicating with the interior of the body.

6. A vehicle body having a front vehicle body wall and a top vehicle body wall, the outer surfaces of the said walls being relatively disposed in such manner that upon forward movement of the vehicle an upwardly moving high pressure air stream is deflected over the extraneous surface of the top wall by the front wall surfaces and flows rearwardly undeflected laterally from its normal rearward path of travel and creates a low pressure area beginning substantially at the initial level of the extraneous top wall surface and extending unbrokenly rearwardly behind the high pressure air stream, characterized by the fact that there are means fixedly limited to placing the interior of the body exclusively in communication with said low pressure area.

7. In a vehicle body having a front vehicle body wall and a top vehicle body wall extending rearwardly therefrom, said walls being so configured externally that upon forward movement of the vehicle air impinging on the forward surface of the front wall is deflected upwardly and over the extraneous surface of the top wall and flows rearwardly undeflected laterally from its normal rearward path of travel and forms thereby an unbroken low pressure area extending continuously rearwardly from behind the upwardly moving stream into overhanging relation to a portion of the extraneous upper surface of the top wall, and means communicating with the interior of the body and having an air outlet passage limited to communication solely with said low pressure area.

8. In a vehicle body having a front vehicle body wall structure and a stationary top vehicle body wall structure extending rearwardly therefrom, said wall structures being so configured externally that by forward movement of the vehicle, air impinging on the forward surface of the front wall structure is deflected upwardly and over the top wall structure and flows rearwardly undeflected laterally from its normal path of travel and forms thereby an unbroken low pressure area extraneously of the body and above the stationary top wall structure and extending rearwardly continuously along a portion thereof from behind said upwardly rising portion of said air stream, an opening in one of said wall structures lying within said low pressure area, and means communicating the opening and the interior of the body.

WILLIAM LINTERN.